United States Patent [19]

Nakaishi et al.

[11] Patent Number: 5,390,997
[45] Date of Patent: Feb. 21, 1995

[54] END FACE SEALING ASSEMBLY DEVICE FOR TRACK SHOE COUPLING

[75] Inventors: Hiroyuki Nakaishi; Hideo Yagi, both of Hirakata, Japan

[73] Assignee: Kabushiki Kaisha Komatsu Seisakusho, Tokyo, Japan

[21] Appl. No.: 168,662

[22] Filed: Dec. 16, 1993

[30] Foreign Application Priority Data

Dec. 21, 1992 [JP] Japan .............................. 4-092128[U]

[51] Int. Cl.$^6$ ........................................ B62D 55/088
[52] U.S. Cl. ........................................ 305/11; 305/14; 277/92
[58] Field of Search ............... 305/11, 14; 277/92, 277/96, 96.1, 96.2

[56] References Cited

U.S. PATENT DOCUMENTS

| | | | |
|---|---|---|---|
| 4,132,418 | 1/1979 | Roli | 277/92 X |
| 4,195,852 | 4/1980 | Roley et al. | 305/11 X |
| 4,262,914 | 4/1981 | Roley | 305/11 X |
| 4,469,336 | 9/1984 | Linne | 305/11 X |
| 4,688,805 | 8/1987 | Crotti et al. | 305/11 X |

FOREIGN PATENT DOCUMENTS

| | | |
|---|---|---|
| 56-42485 | 4/1981 | Japan . |
| 236657 | 3/1990 | Japan . |

*Primary Examiner*—Russell D. Stormer
*Attorney, Agent, or Firm*—Richards, Medlock & Andrews

[57] ABSTRACT

An end face sealing assembly device ($S_2$) comprises a seal ring (15) having an approximately parallelogrammatic cross section so that an annular lip (15c) contacts a bushing end face (4a); a support ring (14) having an approximately L-shaped cross section formed by an axial direction side member (14a) and a radial direction side member (14b), the seal ring (15) being supported by the radial direction side member (14b); and a load ring (16) having an approximately trapezoidal cross section and formed of an elastic material for providing a back pressure to the seal ring (15). The external periphery of the load ring (16) is formed of an outer annular contact surface (16a), a convexly curved front peripheral surface (16b), a rear peripheral surface (16c, 16d), and an inner annular contact surface (16e, 16f). The rear peripheral surface is formed as an inclined linear surface (16c) and a concavely curved surface (16d), with the latter extending from the inclined linear surface to the axial direction side member (14b) of the support ring (14). This load ring configuration provides compression deformation with a uniform annular bulge free from irregularities. The end face sealing assembly provides for stability of a follow-up property of the seal and an increased effective stroke in the thrust direction.

20 Claims, 3 Drawing Sheets

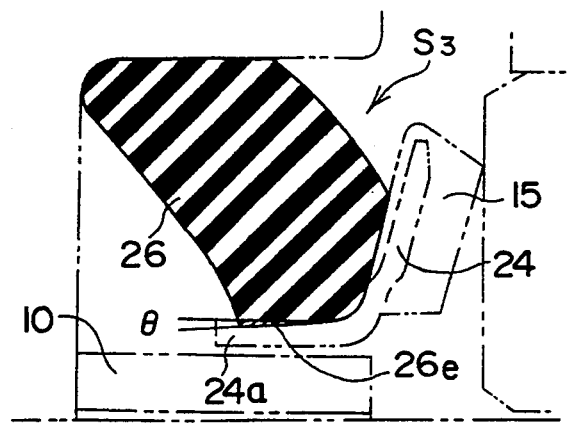
F I G. 3
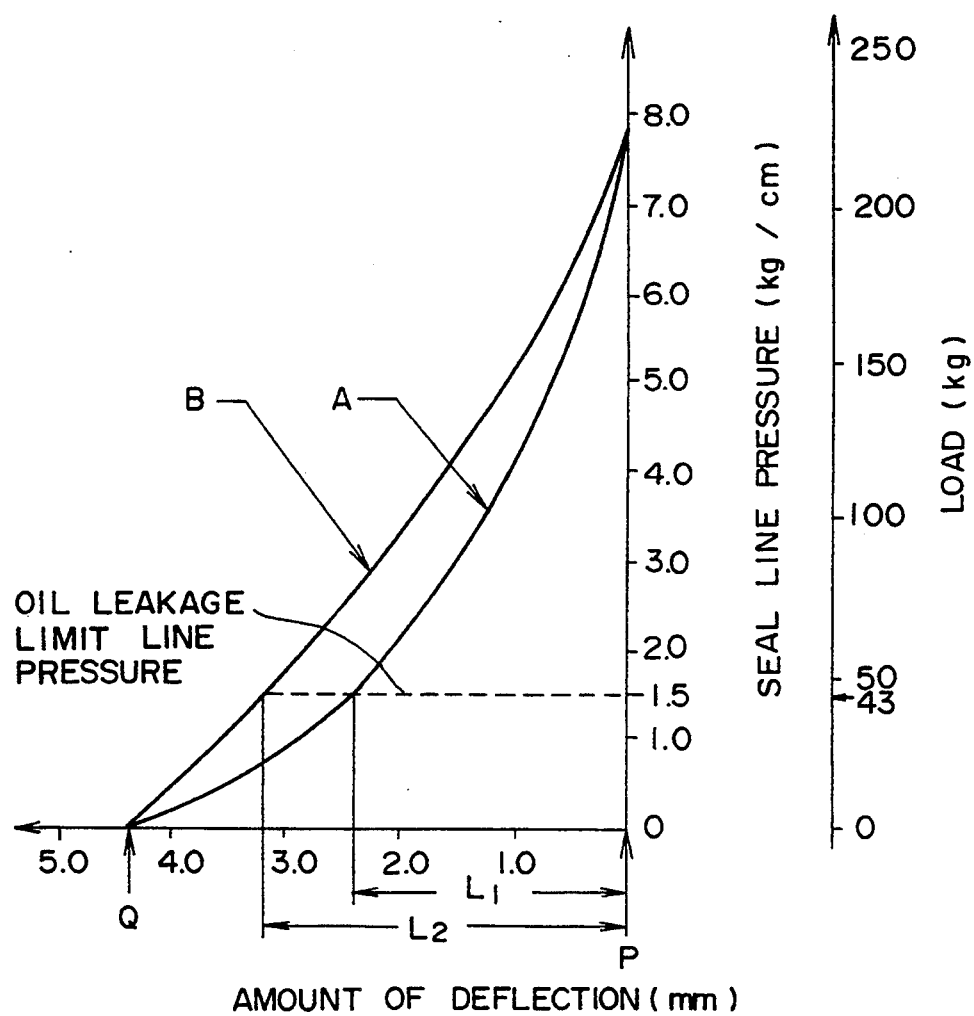
F I G. 4

END FACE SEALING ASSEMBLY DEVICE FOR TRACK SHOE COUPLING

FIELD OF THE INVENTION

The present invention relates to an end face sealing assembly of a track shoe coupling suitable for use in tracked construction machinery, particularly for such machinery which travels on sandy land or land with muddy water.

BACKGROUND OF THE INVENTION

A conventional track shoe coupling for use in tracked construction machinery is illustrated in FIG. 5, wherein an inner link 1 and an outer link 2 are coupled together for relative rotation of one link with respect to the other link in the coupling. Specifically, the links 1 and 2 are articulation-coupled by a pivot pin 6 and an annular bushing 4. The generally cylindrical pivot pin 6 has an end part forcibly fitted into and immovably fixed in a generally cylindrical hole 5 of the outer link 2, while the annular bushing 4 is forcibly fitted into and immovably fixed in a generally cylindrical hole 3 of the inner link 1. The pin 6 extends freely through the axial opening 7 of the annular bushing 4 so that the bushing 4 and the pin 6 are slidably rotated with respect to each other upon relative rotation between links 1 and 2.

An annular counterbore 9, comprising a generally axial side wall surface 9a and a generally radial end wall surface 9b, is provided in the inside face of the outer link 2 at the periphery of hole 5. The counterbore 9 is open to the cylindrical surface of hole 5 as well as to the inside face of outer link 2. An annular thrust bearing 10 is positioned in the counterbore 9. An end face sealing assembly device S is also mounted in the counterbore 9 to prevent intrusion of foreign matter such as sand or muddy water onto the sliding surfaces of the bushing 4 and the pivot pin 6, and to prevent leakage of lubrication oil supplied to the annular gap between pivot pin 6 and bushing 4 from an oil hole 8 provided in the pivot pin 6.

There have been many proposals with respect to the end face sealing assembly device S, and FIG. 6 shows an end face sealing assembly device $S_1$ which the present applicant proposed in Japanese Utility Model Laid-open (U) 2-36657. The end face sealing assembly device $S_1$ is provided with an annular seal ring 12 having an approximately parallelogrammatic cross section in a radial plane, such as the plane of FIG. 6, with the seal ring 12 being made of a urethane-based rubber material. The seal ring 12 makes contact with and is supported by an annular support ring 11 made of a metallic material. The support ring 11 has a radial direction annular member 11a and an axial direction annular member 11b forming an approximately L-shaped cross section in a radial plane. The seal ring 12 has an annular lip part 12a which comes in contact with the end face 4a of the bushing 4 to form an annular seal. In addition, the end face sealing assembly device $S_1$ is provided with a rubber load ring 13 which has an annular body member 13a with an approximately circular cross section in a radial plane, which applies a back pressure to an outer sloping surface 12b of the seal ring 12. The outer sloping surface 12b is a generally frustoconical annular surface which is inclined away from the bushing end face 4a and toward the longitudinal axis of the pin 6. Load ring 13 also has an annular projection 13b which extends outwardly and rearwardly from the body member 13a into contact with the axial surface 9a of the counterbore 9.

The set position P of the bushing 4, which is illustrated in FIG. 6 with a solid line for bushing end face 4a, shows a state where the bushing end face 4a is in sealing contact with lip 12a and is in contact with the thrust bearing 10 to press the thrust bearing 10 against the radial end wall 9b of the counterbore 9 so that the load ring 13 is compressed to a maximum amount. The free position Q of the bushing 4, which is illustrated with a broken line for bushing end face 4a in FIG. 6, shows a state where the bushing end face 4a is just free of contact with the seal ring 12 and is separated axially from the thrust bearing 10 by a stroke distance L. The service life of the seal depends on the length of an effective stroke $L_1$, which is the distance from the set position P towards the free position Q during which the seal is effectively maintained.

However, this end face sealing assembly device $S_1$ is constructed so that the annular circular body 13a of the load ring 13 is supported by the annular projection part 13b which is in contact with the axial wall surface 9a of the counterbore 9. Therefore, as the assembly device $S_1$ approaches the free condition Q, the body member 13a is unwound from compressive contact with the projection part 13b while turning and extending forwardly in the axial direction toward the bushing end face 4a. Consequently, the conventional end face sealing assembly device $S_1$ includes a problem that, when the assembly device approaches the free position Q, as shown with the curve A in FIG. 4, the seal line pressure suddenly falls if the amount of deflection exceeds the effective stroke $L_1$. As the effective stroke $L_1$ corresponding to the oil leakage limit line pressure is short, the follow-up property deteriorates.

Also, the load ring 13 of the end face sealing assembly device $S_1$ is mounted on the external peripheral slope 12b of the seal ring 12, and therefore the load ring 13 can slip on the inclined surface 12b when in the set position P, with the result that the sealing surface pressure is not stabilized.

SUMMARY OF THE INVENTION

An object of the present invention is to solve the above problem. More specifically, it is an object of the present invention to provide an end face sealing assembly device for a track shoe coupling, wherein the end face sealing assembly device is capable of improving a follow-up property, extending an effective stroke, and maintaining a sealing effect for a longer period of time.

The present invention provides an end face sealing assembly device for a track shoe coupling comprising a relatively rigid annular support ring, an elastic annular seal ring, and an elastic load ring. The relatively rigid annular support ring, preferably made of metal, has a generally axial direction annular side member and a generally radial direction annular side member joined together to form an approximately L-shaped cross section in a radial plane. The annular seal ring, preferably made of a urethane-based rubber material, has an approximately parallelogrammatic cross section in a radial plane with an annular lip, and is positioned in contact with and held by the radial direction annular side member so as to present the annular lip to the bushing end face to form the seal when the annular lip comes into contact with the bushing end face. The load ring, preferably made of an elastic nitrile-based rubber material, has an approximately trapezoidal cross section in a radial plane and is positioned behind the seal ring so as to apply a pressure to the seal ring toward the bushing end face.

The periphery of the approximately trapezoidal load ring is formed by an outer annular contact surface, an annular peripheral front surface, an annular peripheral rear surface, and an inner annular contact surface. The outer annular contact surface is in contact with the generally axial wall of the counterbore provided in the track shoe coupling. The annular peripheral front surface is formed as an outwardly curved surface extending from the front edge of the outer annular contact surface to the backside of the seal ring. The annular peripheral rear surface is formed as a combination of a generally linear inclined annular surface and a generally curved annular surface, with the generally linear inclined annular surface extending forwardly from the generally radial end wall of the counterbore toward the generally axial direction annular side member, and the generally curved annular surface extending from the front end of the linear inclined annular surface to the generally axial direction side member of the support ring. The inner annular contact surface is in contact with the support ring and the seal ring and extends from the front end of the generally curved annular surface to the front end of the annular peripheral front surface. In this configuration, the load ring is adapted to be compression-deformed to produce a uniform annular bulge without irregularities when the end face sealing assembly device is in the set position P where the bushing end face is in contact with the thrust bearing and the load ring is in its maximum compression condition.

The load ring configuration provides an overlap in the axial direction between the outer annular contact surface and the inner annular contact surface, thereby increasing the stability of the load ring. This overlap is provided by having the rear edge of the annular peripheral front surface in front of the front edge of the annular peripheral rear surface. The load ring mounting dimension, which is the axial distance along which the inner annular contact surface of the load ring is in contact with the generally axial direction annular side member of the support ring, is selected to be at least 60% of the thickness of the load ring.

In the unmounted condition of the load ring, the portion of the inner annular contact surface which will contact the axial component of the support ring can be in the form of a frustoconical surface having a smaller diameter at the rear end thereof than at the front end thereof so as to provide a fitting allowance with an acute angle $\Theta$ from the axial direction, the outer diameter of the axial component of the support ring being at least approximately the diameter of the frustoconical surface at the front end thereof and greater than the diameter at the rear end of the frustoconical surface in the unmounted condition. This configuration ensures prevention of slippage between the load ring and the seal ring.

In addition, the load ring is preferably formed with a nitrile-based rubber material having a hardness in the range of about 50 to about 70 on the durometer A scale, while the seal ring is preferably formed with a urethane-based rubber material having a hardness in the range of about 30 to about 50 on the durometer D scale.

The end face sealing assembly device as described above is adapted so that the fall of the seal line pressure in reference to the deflection in the vicinity of the free position Q can be complemented, particularly owing to the profile characteristics of the load ring and therefore the follow-up property of the seal is improved, the effective stroke for maintaining the sealing effect is consequently prolonged, the load ring is free from deformation due to slipping, and a stable seal surface pressure is obtained.

BRIEF DESCRIPTION OF THE DRAWINGS

FIG. 3 is a cross sectional view illustrating an end face sealing assembly device in accordance with a second embodiment of the present invention;

FIG. 4 is a graph explaining a relationship between the amount of deflection and the seal line pressure of the embodiments of the present invention and the prior art;

DETAILED DESCRIPTION OF THE PREFERRED EMBODIMENTS

Figure 1:
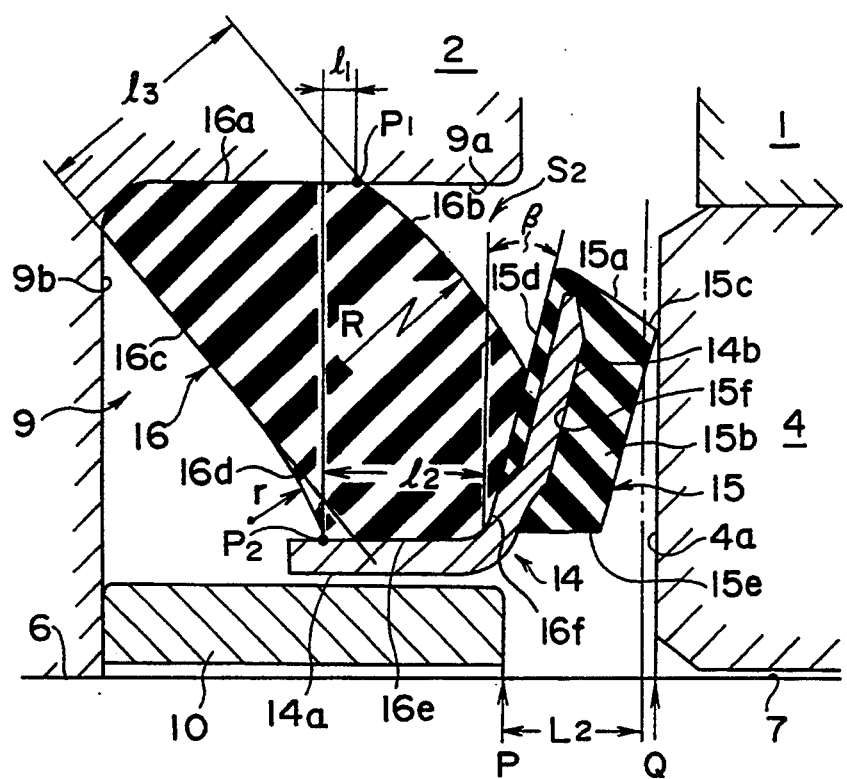
FIG. 1 is a cross sectional view illustrating a free position of an end face sealing assembly device in accordance with a first embodiment of the present invention.
Figure 2:
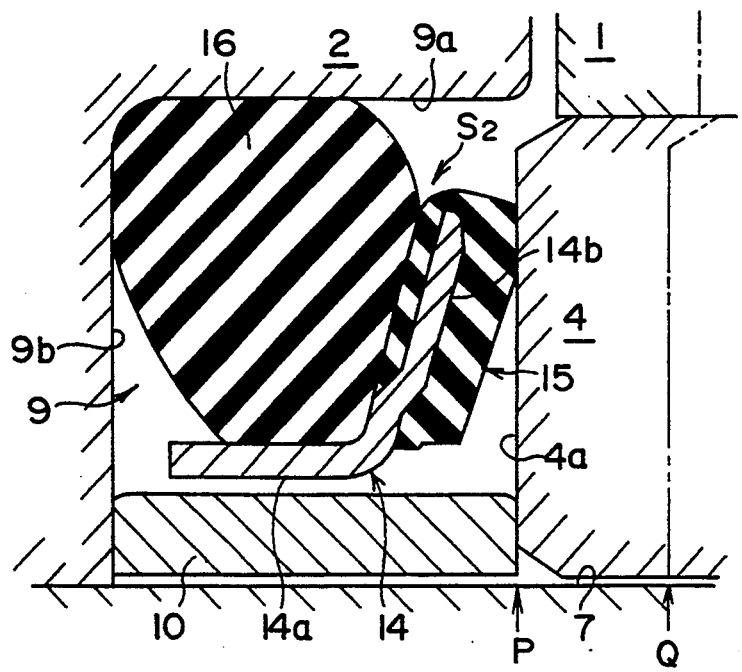
FIG. 2 is a cross sectional view illustrating a set position of the end face sealing assembly device shown in FIG. 1.
Figure 5:
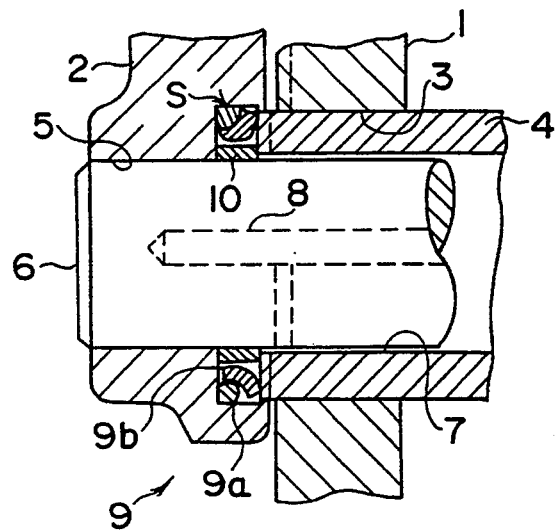
FIG. 5 is a cross sectional view illustrating a track shoe coupling of the prior art.
Figure 6:
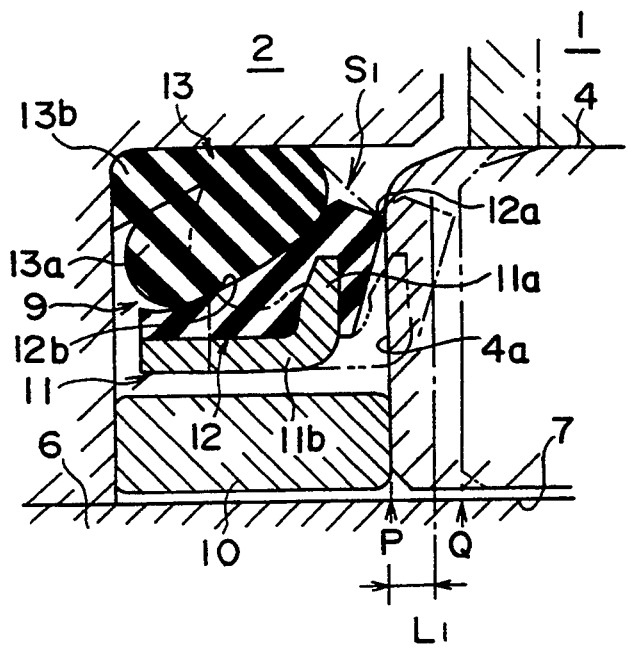
FIG. 6 is a cross sectional view illustrating an end face sealing assembly device of the prior art.

A first embodiment of an end face sealing assembly device in a track shoe coupling in accordance with the present invention is illustrated in FIGS. 1 and 2, wherein components which are the same as in FIGS. 5 and 6 are identified by the same symbols employed in FIGS. 5 and 6, and accordingly a detailed description thereof is not repeated.

FIG. 1 shows the end face sealing assembly device $S_2$ in the free position Q, and FIG. 2 shows the end face sealing assembly device $S_2$ in the set position P. As used herein with respect to the end face sealing assembly device, the orientational term "front" indicates a portion of the end face sealing assembly device which faces towards or is adjacent to the bushing end face $4a$ and the orientational term "rear" indicates a portion of the end face sealing assembly device which faces away from or is remote from the bushing end face $4a$.

The end face sealing assembly device $S_2$ comprises a relatively rigid annular support ring 14, an annular seal ring 15, and an elastic load ring 16. The annular support ring 14 is preferably made of metal, and has a generally axial direction annular side member $14a$ and a generally radial direction annular side member $14b$ joined together at the front end of the generally axial direction annular side member $14a$ with the generally radial direction annular side member $14b$ extending outward from the generally axial direction annular side member $14a$ to form an approximately L-shaped cross section in a radial plane, i.e., a plane which contains the longitudinal axis of pin 6. In the illustrated embodiment, the generally axial direction annular side member $14a$ is in the form of a generally cylindrical annular member, and the generally radial direction annular side member $14b$ is in the form of a generally frustoconical annular member extending outwardly and forwardly from the front end of the generally cylindrical annular member $14a$ at an acute angle $\beta$ to the plane which is perpendicular to the longitudinal axis of pin 6 and extends through the line of jointure of the generally cylindrical annular member $14a$ and the generally frustoconical annular member $14b$. The length of the generally cylindrical annular member 14a is such that the rear end of the generally cylindrical annular member 14a is spaced from the generally radial end wall 9b of the counterbore 9 in both the free position Q, illustrated in FIG. 1, and the set position P, illustrated in FIG. 2.

The annular seal ring 15 is preferably made of a urethane-based rubber material, and more preferably is made of a relatively hard urethane-based rubber material with a hardness in the range of about 30 to about 50 on the durometer D scale. The annular seal ring 15 has an approximately parallelogrammatic cross section in a radial plane. In the illustrated embodiment, the seal ring 15 has a trapezoidal cross section in a radial plane, with its front surface 15b and its rear surface 15d being at least generally parallel to each other and to the frustoconical annular member 14b of the support ring 14. The inner peripheral surface 15e of seal ring 15 can be substantially parallel to the longitudinal axis of pin 6, while the outer peripheral surface 15a can be inclined forwardly and inwardly to form an angular annular lip 15c in conjunction with the front surface 15b. The seal ring 15 is provided with an annular cavity 15f having a shape which conforms to the shape of the frustoconical annular member 14b of the support ring 14 in order to receive and engage the frustoconical member 14b such that the seal ring 15 is positioned in contact with and held by the frustoconical member 14b while being inclined outwardly and forwardly towards the bushing end face 4a so as to present the annular lip 15c to the bushing end face 4a to form the seal when the annular lip 15c comes into contact with the bushing end face 4a. The forward portion of the frustoconical annular member 14a can be offset forwardly with respect to the rear portion of the frustoconical annular member 14a so that the rear surface 15d of the seal ring 15 is aligned with the outer surface of the rear portion of the frustoconical annular member 14a, thereby presenting an at least substantially linear face to the load ring 16.

The load ring 16 is preferably made of an elastic nitrile-based rubber material and more preferably is made of a nitrile-based rubber material with a hardness in the range of about 50 to about 70 on the durometer A scale. The load ring 16 has an approximately trapezoidal cross section in a radial plane and is positioned behind the seal ring 15 so as to apply a back pressure to the seal ring 15 toward the bushing end face 4a. The load ring 16 substantially affects the follow-up property of the seal and it is therefore necessary to have a characteristic profile to extend the follow-up property. In this embodiment, therefore, the external periphery of the load ring 16 is formed by an outer annular contact surface 16a, an annular peripheral front surface 16b, an annular peripheral rear surface 16c, 16d, and an inner annular contact surface 16e, 16f.

The outer annular contact surface 16a of the load ring 16 is a generally cylindrical surface in contact with the generally cylindrical axial wall 9a of the counterbore 9 provided in the track shoe coupling of inner link 1 and outer link 2. The annular peripheral front surface 16b is formed as an outwardly curved, i.e., convex, generally circular surface having a radius R and extending forwardly from the forward end of the outer contact surface 16a to the backside 15d of the seal ring 15. The radius R extends rearwardly from the annular peripheral front surface 16b and generally towards the intersection of the radial end wall 9b and the hole 5 in the outer link 2. The annular peripheral rear surface is formed as a combination of a generally linear inclined annular surface 16c and a generally curved annular surface 16d. The generally linear inclined annular surface 16c extends forwardly from a point on the generally radial end wall 9b, adjacent to the corner formed by the axial wall 9a and the radial end wall 9b, toward the generally cylindrical annular member 14a. The generally curved annular surface 16d extends forwardly and inwardly from the forward end of the linear inclined annular surface 16c to the generally cylindrical annular member 14a of the support ring 14. Thus, the generally curved annular surface 16d is a concave surface having a radius r. The radius r extends rearwardly from the annular peripheral front surface 16b and generally towards the intersection of the radial end wall 9b and the hole 5 in the outer link 2. The inner annular contact surface is formed as a combination of a generally cylindrical surface 16e and a generally frustoconical surface 16f. The generally cylindrical surface 16e is in contact with the cylindrical member 14a of the support ring 14, and extends from the forward end of the generally curved annular surface 16d to the forward end of the cylindrical member 14a. The generally frustoconical surface 16f is in contact with the frustoconical member 14b and the rear surface 15d of the seal ring 15, and extends from the forward end of the cylindrical member 14a to the forward end of the annular peripheral front surface 16b. In this configuration, the load ring 16 is adapted to be compression-deformed to show a uniform annular bulge without irregularities, as shown in FIG. 2, when the end face sealing assembly device is in the set position P, where the bushing end face 4a is in contact with the thrust bearing 10 and the load ring 16 is in its maximum compression condition.

The shape of the annular peripheral front surface 16b and the shape of the annular peripheral rear surface 16c, 16d are profiled so that there is a specified overlap in the axial direction of the outer annular contact surface 16a and the inner annular contact surface 16e. This overlap value, which is identified as $l_1$ in FIG. 1, is provided to prevent slippage of the load ring 16 against the back portion of the seal ring 15 when the end face assembly device $S_2$ is in the set condition P. The overlap value $l_1$ is the distance between the respective starting points $P_1$ and $P_2$. $P_1$ is the front edge of the outer annular contact surface 16a and the starting point of the annular peripheral front surface 16b, i.e., the annular line where the rearmost edge of the annular peripheral front surface 16b contacts the generally axial side wall 9a of the counterbore 9. $P_2$ is the front edge of the generally curved annular surface 16d of the annular peripheral rear surface and the starting point of the inner annular contact surface 16e, i.e., the annular line where the front edge of the generally curved annular surface 16d of the annular peripheral rear surface contacts the generally axial direction annular side member 14a of the support ring 14. The load ring mounting dimension $l_2$, which is the axial distance along which the inner annular contact surface 16e of the load ring 16 is in contact with the generally axial direction annular side member 14a of the support ring 14, is selected to be at least $0.6 \times l_3$, where $l_3$ is the thickness of the load ring 16 measured between $P_1$ and the generally linear inclined annular surface 16c of the annular peripheral rear surface of the load ring 16. The load ring 16 with such characteristic profile can be compression-deformed to produce a uniform annular bulge free from irregularities when it is in the set condition P, as illustrated in FIG. 2.

In the case of the end face sealing assembly device $S_2$ provided with the load ring 16 having such profile characteristic, the seal line pressure curve in reference to the amount of deflection closely approximates a linear state, as shown by the curve B in FIG. 4, thereby improving the follow-up property to raise the seal line pressure at deflections approaching the free position Q. In other words, the effective stroke $L_2$ for the oil leakage limit line pressure (1.5 kg/cm) can be increased to 3.2 mm so that the seal line pressure does not suddenly fall even upon closely approaching the free position Q, and the resultant effective stroke is more than 1.3 times as large as the conventional effective stroke $L_1$ of 2.4 mm.

A second embodiment of the present invention is illustrated in FIG. 3, wherein components which are the same as in FIGS. 1 and 2 are identified by the same symbols employed in FIGS. 1 and 2, and accordingly a detailed description thereof is not repeated. The support ring 24 of the second embodiment is identical to the support ring 14 of the first embodiment, while the load ring 26 of the second embodiment is identical to the load ring 16 of the first embodiment except as noted below. In this second embodiment, the prevention of slip deformation of the load ring 26 is further ensured by providing that the diameter of the rear portion of the generally cylindrical surface 26e of the inner annular contact surface of the load ring 26 is, in the unmounted condition of the load ring 26, smaller than the diameter of the front portion of the generally cylindrical surface 26e and preferably smaller than the outer diameter of the axial component 24a of the support ring 24. The generally cylindrical surface 26e, which is the portion of the inner annular contact surface of the load ring 26 which will contact the axial component 24a of the support ring 24, can be in the form of a frustoconical surface having a smaller diameter at the rear end thereof than at the front end thereof so as to provide a fitting allowance with an acute angle Θ from the axial direction, the outer diameter of the generally axial component 24a of the support ring 24 being at least approximately the diameter of the frustoconical surface at the front end thereof and greater than the diameter at the rear end of the frustoconical surface in the unmounted condition. In other words, the rear portion 26e of the inner annular contact surface is in the form of a frustoconical surface which tapers inwardly toward the rear of the load ring 24 at an acute angle. This configuration of the load ring 26 ensures a tight contact between the load ring 26 and the support ring 24, thereby reducing the possibility of slippage between the load ring 26 and the axial component 24a of the support ring 24 as well as between the load ring 26 and the seal ring 15.

In the case of the end face sealing assembly device $S_3$ provided with the load ring 26 having such profile characteristic, the follow-up property of the seal is improved so that a seal line pressure can be maintained even near the free position Q.

As described above, the present invention is intended to effectively prevent intrusion of foreign matters into the sliding surfaces of the bushing and the pivot pin of the track shoe coupling and to prevent leakage of lubrication oil, by maintaining the sealing performance for a long period of time, and thus contribute to qualitative improvement of the track shoe and extension of its service life.

Reasonable variations and modifications of the invention are possible within the scope of the disclosure of the foregoing description and the drawings. While the invention is designed for use with a track shoe coupling, it can be employed for sealing an annular space between a bushing and a member where the member contains an annular counterbore with a generally axial side wall and a generally radial end wall, the bushing has a bushing end face facing the annular counterbore, and the end face sealing assembly device is positionable in the annular counterbore to effect a seal between the bushing end face and the member.

What is claimed is:

1. An end face sealing assembly device for sealing an annular space between a bushing and a member where the member contains an annular counterbore with a generally axial side wall and a generally radial end wall, and the bushing has a bushing end face facing the annular counterbore, said end face sealing assembly device being positionable in the annular counterbore and comprising:
   an annular support ring having an axial direction side member and a radial direction side member joined together so as to form an annulus having an approximately L-shaped cross section in a radial plane;
   an annular seal ring having a backside and a frontside with an annular lip formed on said frontside, said annular seal ring being in contact with and held by said radial direction side member so that said annular lip forms an annular seal surface with the bushing end face when said annular lip comes into contact with the bushing end face; and
   an annular load ring positioned so as to apply a pressure to the backside of said seal ring toward the bushing end face, said annular load ring having a periphery comprising:
      an outer annular contact surface which contacts the generally axial wall of the annular counterbore,
      an annular peripheral front surface formed as a curved surface extending from the outer annular contact surface to the backside of the seal ring,
      an annular peripheral rear surface formed as a combination of a generally linear inclined annular surface and a generally curved annular surface, with the generally linear inclined annular surface extending from the generally radial end wall of the annular counterbore toward the support ring, and the generally curved annular surface extending from the linear inclined annular surface to the axial direction side member of the support ring, and
      an inner annular contact surface in contact with the support ring and the seal ring and extending from a front end of the generally curved annular surface to a front end of the annular peripheral front surface,
   the load ring being adapted to be compression-deformed to provide a uniform bulge without irregularities when the end face sealing assembly device is compressed between the bushing end face and the generally radial end wall of the annular counterbore.

2. An end face sealing assembly device in accordance with claim 1, wherein said load ring has an approximately trapezoidal cross section in a radial plane.

3. An end face sealing assembly device in accordance with claim 1, wherein said inner annular contact surface comprises a generally cylindrical surface and a generally frustoconical surface, with the generally cylindrical surface being in contact with said axial direction side member and extending from said front end of said generally curved annular surface to a front end of said axial direction side member, and with the generally frustoconical surface being in contact with the radial direction side member and said seal ring and extending from said front end of said axial direction side member to said front end of said annular peripheral front surface.

4. An end face sealing assembly device in accordance with claim 1, wherein said annular peripheral front surface has a generally convex shape in a radial plane, and wherein said generally curved annular surface has a generally concave shape in a radial plane.

5. An end face sealing assembly device in accordance with claim, 1, wherein a rear portion of said inner annular contact surface is in the form of a frustoconical surface which tapers inwardly toward the rear of the load ring at an acute angle.

6. An end face sealing assembly device in accordance with claim 1, wherein said load ring has an overlap in the axial direction between the outer annular contact surface and the inner annular contact surface provided by a junction of the outer annular contact surface and the annular peripheral front surface being in front of a junction of the inner annular contact surface and the annular peripheral rear surface.

7. An end face sealing assembly device in accordance with claim 1, wherein said support ring is made of a metallic material, said seal ring is made of a urethane-based rubber material, and said load ring is made of an elastic nitrile-based rubber material.

8. An end face sealing assembly device in accordance with claim 1, wherein said load ring is made of a nitrile-based rubber material with a hardness in the range of about 50 to about 70 on the durometer A scale.

9. An end face sealing assembly device in accordance with claim 1, wherein the axial length of said load ring which is in contact with the axial direction side member is at least 60% of the thickness of said load ring.

10. An end face sealing assembly device in accordance with claim 1, wherein said load ring has an approximately trapezoidal cross section in a radial plane;
wherein said inner annular contact surface comprises a generally cylindrical Surface and a generally frustoconical surface, with the generally cylindrical surface being in contact with said axial direction side member and extending from said front end of said generally curved annular surface to a front end of said axial direction side member, and with the generally frustoconical surface being in contact with the radial direction side member and said seal ring and extending from said front end of said axial direction side member to said front end of said annular peripheral front surface;
wherein said annular peripheral front surface has a generally convex shape in a radial plane, and wherein said generally curved annular surface has a generally concave shape in a radial plane;
wherein said load ring has an overlap in the axial direction between the outer annular contact surface and the inner annular contact surface provided by a junction of the outer annular contact surface and the annular peripheral front surface being in front of a junction of the inner annular contact surface and the annular peripheral rear surface;
wherein said support ring is made of a metallic material, said seal ring is made of a urethane-based rubber material, and said load ring is made of an elastic nitrile-based rubber material with a hardness in the range of about 50 to about 70 on the durometer A scale; and
wherein the axial length of said load ring which is in contact with the axial direction side member is at least 60% of the thickness of said load ring.

11. A track shoe coupling comprising a first link, a second link, a pivot pin fixed in said first link, an annular bushing fixed in said second link, said annular bushing having an axial hole, said pivot pin extending into said axial hole, said first link having an annular counterbore surrounding said pivot pin, said annular counterbore having a generally axial side wall and a generally radial end wall, said bushing having a bushing end face facing the annular counterbore, and an end face sealing assembly device positioned in said annular counterbore, said end face sealing assembly device comprising:
an annular support ring having an axial direction side member and a radial direction side member joined together so as to form an annulus having an approximately L-shaped cross section in a radial plane;
an annular seal ring having a backside and a frontside with an annular lip formed on said frontside, said annular seal ring being in contact with and held by said radial direction side member so that said annular lip forms an annular seal surface with the bushing end face when said annular lip contacts said bushing end face; and
an annular load ring positioned so as to apply a pressure to the backside of said seal ring toward the bushing end face, said annular load ring having a periphery comprising:
an outer annular contact surface which contacts the generally axial wall of the annular counterbore,
an annular peripheral front surface formed as a curved surface extending from the outer annular contact surface to the backside of the seal ring,
an annular peripheral rear surface formed as a combination of a generally linear inclined annular surface and a generally curved annular surface, with the generally linear inclined annular surface extending from the generally radial end wall of the annular counterbore toward the support ring, and the generally curved annular surface extending from the linear inclined annular surface to the axial direction side member of the support ring, and
an inner annular contact surface in contact with the support ring and the seal ring and extending from a front end of the generally curved annular surface to a front end of the annular peripheral front surface,
the load ring being adapted to be compression-deformed to provide a uniform bulge without irregularities when the end face sealing assembly device is compressed between the bushing end face and the generally radial end wall of the annular counterbore.

12. A track shoe coupling in accordance with claim 11, wherein said load ring has an approximately trapezoidal cross section in a radial plane.

13. A track shoe coupling in accordance with claim 11, wherein said inner annular contact surface comprises a generally cylindrical surface and a generally frustoconical surface, with the generally cylindrical surface being in contact with said axial direction side member and extending from said front end of said generally curved annular surface to a front end of said axial direction side member, and with the generally frustoconical surface being in contact with the radial direction side member and said seal ring and extending from said front end of said axial direction side member to said front end of said annular peripheral front surface.

14. A track shoe coupling in accordance with claim 11, wherein said annular peripheral front surface has a generally convex shape in a radial plane, and wherein said generally curved annular surface has a generally concave shape in a radial plane.

15. A track shoe coupling in accordance with claim 11, wherein a rear portion of said inner annular contact surface in the form of a frustoconical surface which tapers inwardly toward the rear of the load ring at an acute angle.

16. A track shoe coupling in accordance with claim 11, wherein said load ring has an overlap in the axial direction between the outer annular contact surface and the inner annular contact surface provided by a junction of the outer annular contact surface and the annular peripheral front surface being in front of a junction of the inner annular contact surface and the annular peripheral rear surface.

17. A track shoe coupling in accordance with claim 11, wherein said support ring is made of a metallic material, said seal ring is made of a urethane-based rubber material, and said load ring is made of an elastic nitrile-based rubber material.

18. A track shoe coupling in accordance with claim 11, wherein said load ring is made of a nitrile-based rubber material with a hardness in the range of about 50 to about 70 on the durometer A scale.

19. A track shoe coupling in accordance with claim 11, wherein the axial length of said load ring which is in contact with the axial direction side member is at least 60% of the thickness of said load ring.

20. A track shoe coupling in accordance with claim 11, wherein said load ring has an approximately trapezoidal cross section in a radial plane;
    wherein said inner annular contact surface comprises a generally cylindrical surface and a generally frustoconical surface, with the generally cylindrical surface being in contact with said axial direction side member and extending from said front end of said generally curved annular surface to a front end of said axial direction side member, and with the generally frustoconical surface being in contact with the radial direction side member and said seal ring and extending from said front end of said axial direction side member to said front end of said annular peripheral front surface;
    wherein said annular peripheral front surface has a generally convex shape in a radial plane, and wherein said generally curved annular surface has a generally concave shape in a radial plane;
    wherein said load ring has an overlap in the axial direction between the outer annular contact surface and the inner annular contact surface provided by a junction of the outer annular contact surface and the annular peripheral front surface being in front of a junction of the inner annular contact surface and the annular peripheral rear surface;
    wherein said support ring is made of a metallic material, said seal ring is made of a urethane-based rubber material, and said load ring is made of an elastic nitrile-based rubber material with a hardness in the range of about 50 to about 70 on the durometer A scale; and
    wherein the axial length of said load ring which is in contact with the axial direction side member is at least 60% of the thickness of said load ring.

* * * * *